United States Patent Office.

OTTO WUTH, OF PITTSBURG, PENNSYLVANIA.

*Letters Patent No. 95,752, dated October 12, 1869.*

IMPROVEMENT IN THE MANUFACTURE OF CRYSTAL GLASS.

The Schedule referred to in these Letters Patent and making part of the same.

*To all whom it may concern:*

Be it known that I, OTTO WUTH, of the city of Pittsburg, in the county of Allegheny, and State of Pennsylvania, have invented a new and useful Improvement in Manufacture of Crystal Glass; and I do hereby declare the following to be a full, clear, and exact description thereof.

My invention relates to the manufacture of glass, in which soda is used, together with lime and sand, or any other ingredients, which is known as crystal glass.

Heretofore, glass manufacturers, in order to improve the quality of their glass, have used, with the lime and sand, bicarbonate of soda, which contains only about thirty-seven per cent. of soda, instead of soda-ash, which, although it is much cheaper and has a larger percentage of soda, yet, as manufactured commercially, even when of a high grade, contains from five to six per cent. of sulphate of soda and chloride of sodium. These last-named ingredients are impurities in the soda-ash, and are so destructive to the pots used for melting the glass that the glass manufacturers prefer to use the bicarbonate of soda, although it is so much more expensive.

My improvement consists in the use, (in lieu of the bicarbonate of soda, or of the soda-ash of commerce,) of an article of monohydrate of carbonate of soda, (which may, if desired, be rendered anhydrous by driving off the water with heat,) prepared by a new process of my invention, which I will briefly describe.

I take the soda-ash of commerce (preferring that of high grade, containing from fifty-four to fifty-six per cent. of soda,) and dissolve it in hot water, with the use of steam or an open fire, as may be preferred, until I obtain a saturated solution, but not carrying on the process of boiling so far as to cause the precipitation of the soda-ash.

This saturated solution is then filtered to remove all foreign substances or undissolved particles of soda-ash, and then boiled, by means of heat, in an open kettle until about one-half of the water is removed, during which process the monohydrate of carbonate of soda is precipitated.

This precipitate is removed, and, when the water is drained off, is fit for use; or, if preferred, the water still remaining in combination (in the monohydrate) may be driven off by heat, giving the anhydrous carbonate of soda.

The liquor remaining from this process contains the impurities of the soda-ash, (sulphate of soda, chloride of sodium, &c.,) with only one-half, or thereabouts, of the soda contained in the original solution.

This liquor, on cooling, deposits crystals of sal-soda, after being allowed to stand three or four days, which crystals contain some of the impurities before mentioned, not more, however, than does the soda-ash of commerce.

The sal-soda thus obtained may be used alone or with more soda-ash, in making the solution for the repetition of the process hereinbefore described.

This monohydrate of the carbonate of soda is used in place of the bicarbonate of soda in the preparation of the batch or mix for the manufacture of crystal glass, in such quantity or proportion as shall be the equivalent of the bicarbonate used by each manufacturer, according to the kind or quality of glass to be made.

If preferred, the anhydrous carbonate of soda, prepared from the monohydrate of the carbonate, as before stated, may be used, although I believe that the monohydrate will be found more desirable in practice.

The advantages derived from the use of this article arise from its comparative freedom from impurities and the great relative cheapness with which it may be made, and the ease with which it may be manufactured, and the large percentage of soda which it yields, as compared with the bicarbonate which is now employed.

Having thus described my improvement in the manufacture of glass,

What I claim as my invention, and desire to secure by Letters Patent, is—

The use, together with lime and sand, or other ingredients, in preparing the batch or mix for making glass, of the monohydrate of carbonate of soda, (or the anhydrous carbonate of soda,) prepared as hereinbefore described.

In testimony whereof, I, the said OTTO WUTH, have hereunto set my hand.

O. WUTH.

Witnesses:
 JOHN GLENN,
 THOS. B. KERR.